US008731879B2

(12) United States Patent
Fauvel et al.

(10) Patent No.: US 8,731,879 B2
(45) Date of Patent: May 20, 2014

(54) DEVICE FOR BALANCING A SIMULATION PLATFORM, AND ASSOCIATED METHOD

(75) Inventors: Thomas Fauvel, Toulouse (FR); Fabien Lavergne, Aussonne (FR)

(73) Assignee: AIRBUS Operations S.A.S., Toulouse (FR)

( * ) Notice: Subject to any disclaimer, the term of this patent is extended or adjusted under 35 U.S.C. 154(b) by 70 days.

(21) Appl. No.: 13/115,540

(22) Filed: May 25, 2011

(65) Prior Publication Data

US 2011/0295574 A1     Dec. 1, 2011

(30) Foreign Application Priority Data

May 26, 2010  (FR) ...................................... 10 02214

(51) Int. Cl.
*G06F 17/10*     (2006.01)
(52) U.S. Cl.
USPC ................................................. 703/2; 703/13
(58) Field of Classification Search
None
See application file for complete search history.

(56) References Cited

U.S. PATENT DOCUMENTS

| | | | | |
|---|---|---|---|---|
| 7,756,592 | B2 * | 7/2010 | Craven | 700/30 |
| 7,853,392 | B2 * | 12/2010 | Healey et al. | 701/100 |
| 2010/0131252 | A1 * | 5/2010 | Harris | 703/6 |

OTHER PUBLICATIONS

Lavergne, "Synthetic Methodology of Nonlinear and Robust Control Laws: Application to Transport Plane Trajectory Monitoring", Section 2.2.2, translated into English by USPTO on Jul. 2013, from "Méthodologie de synthèse de lois de commande non-linéaires et robustes: Application au suivi de trajectoire des avions de transport", pp. 39-42, 2005.*
Fabien Lavergne, "Methodology of Synthesis of Non-Linear and Robust Control Laws: Application to the Tracking of Transport Airplanes", Thesis, 2005 (Méthodologie de synthése de lois de commande non-linéaires et robustes: Application au suivi de trajectoire des avions de transport, Mémoire de thése de Fabien Lavergne), pp. 1-248.

* cited by examiner

*Primary Examiner* — Thai Phan
*Assistant Examiner* — Herng-Der Day
(74) *Attorney, Agent, or Firm* — Oblon, Spivak, McClelland, Maier & Neustadt, L.L.P.

(57) ABSTRACT

Balancing a simulation platform including a nonlinear aeronautical system, the balancing including servoing of an output value of the system to a recorded value, including a first filter producing an inversion of a simplified model of the system for generating a control for the system based on a model correction information item estimating a modeling error of the simplified model and an information item on difference between the output value and the recorded value, and a modeling corrector looping including a second filter using the simplified model to calculate, based on the control and the output value, the model correction item to be supplied to the first filter.

15 Claims, 4 Drawing Sheets

DEVICE FOR BALANCING A SIMULATION PLATFORM, AND ASSOCIATED METHOD

BACKGROUND OF THE INVENTION

This invention relates to balancing a simulation platform in particular for aeronautical systems, and especially such a platform, a method and a balancing device.

The simulation of equipment items is a field separate from the actual operation of such equipment items, in particular because of the fact that it takes part, to a great extent prior to operation, in the development of these operating equipment items.

In a standard function, through the use of software or hardware models representative of the performances of systems and their environments, simulation makes it possible to considerably reduce development costs.

In the specific field of aeronautics, new aircraft architectures generally are developed by simulating all or part of the equipment items making up these architectures.

A simulation platform thus has various proportions of equipment items corresponding to the systems of the aircraft, in particular in the form of real equipment items and/or equipment items simulated by a software model (engine, flight control laws, fuel, hydraulics, etc.), and software models representative of components of the environment in which the aircraft is led to travel or of the pilot's cockpit (visual, aerodynamics, flight mechanics or other aspects of the environment of the aircraft such as atmosphere, ground, etc.).

All the software models and real equipment items adopted constitute the components of the simulation platform. Each component has a transfer function or "distinctive dynamic," linking its inputs to its outputs. These components are brought together and interact with the aid of data flows circulating through inputs/outputs of a general simulation application.

Aircraft simulation generally is used to develop and validate airplane systems in the entire performance envelope, for example at take-off, in approach/landing phase or in cruising.

During actual simulations by an operator, the simulation platform and application thus are set to an initialization mode by which the simulated aircraft is positioned in space, placing it in a stable static and dynamic balance taking into account the simulated environment of the aircraft. This positioning and this balance therefore are led to vary considerably according to the flight parts to be simulated.

Once this balance is achieved, the application is changed over to operational simulation mode consisting in executing the simulation of the aircraft by reproducing the functional aspect of the aircraft from its balance position during a given flight phase.

This preliminary balancing of the aircraft is crucial in order to be able to effect a changeover to operational mode under the best conditions, in particular avoiding any discontinuity of the state of the simulated systems. Such a discontinuity in fact may well make the performance of the simulated aircraft, and therefore of the simulation platform, possibly implemented in the form of an articulated prototype, uncontrollable. Such a prototype on jacks controlled by the simulation operation and possible holding operators then may fall, causing injuries.

Balancing generally consists in determining a configuration of the controls (movable surfaces, engine thrust) and other parameters of the aircraft, according to its position in space, its velocity vector and/or acceleration (amplitude and orientation) and atmospheric conditions chosen prior to the start of the simulation.

By way of example, one may be led to calculate the airplane attitude and the positions of the elevator, rudder, aileron and throttle controls, which make it possible to attain target values for the following linear and angular accelerations $\dot{U}x_1$, $\dot{U}y_1$, $\dot{U}z_1$, $\dot{P}_1$, $\dot{Q}_1$ and $\dot{R}_1$ or corresponding speeds $Ux_1$, $Uy_1$, $Uz_1$, $P_1$, $Q_1$ and $R_1$.

This determination is not without difficulty, given that the simulation components, whether they are the real equipment items or simulating equipment items supplied by subcontractors, more often than not are "black boxes" the transfer functions of which remain unknown.

Among the various conceivable balancing methods, one may consist in reusing airplane parameter recordings made during flights for example, in order to determine the configuration of the aircraft according to the desired target values. Such a solution, however, cannot be used during the process of manufacturing a new aircraft, since the latter has not yet flown. Moreover, this method makes it possible to achieve a balancing only in a limited number of configurations because it is based on a limited number of recordings. It therefore is impossible to balance all the desired situations.

A second method consists in staging a flight of the aircraft from a fully known balance position (generally stationary before take-off) until same is in the desired position. This solution, however, is costly in time (flight time) and is highly sensitive to any modeling error of the model used for staging the flight.

A third method, more widely used, employs a simulation model within the application of the same name for balancing purposes only. This simulation model connects the variables of control U (position of the controls of the airplane, for example) to be determined to the values of output Y, of speed and acceleration type.

Balancing is carried out axis by axis (longitudinal, lateral) on the basis of a linear servoing of the simulation model, seeking to have the values of output Y converge toward the desired target values $Y_c$: $U=K(Y_c-Y)$, up to a certain threshold defined by the user or the developer. During this phase, various simulation components are called upon, in particular the flight mechanics, the atmosphere, the flight controls or even the engines.

The simulation model generally is established without precise knowledge of the transfer function of the equipment item concerned.

The choice of the variables servoed and set according to the target flight point is made with the aid of common sense and a good empirical knowledge of balancing.

By way of example, in the case of servoing of the longitudinal speed $Ux_1$ with thrust T, the servoing used by this third method appears in the form: $T=K \cdot (Ux_{1c}-Ux_1)$.

This third method, however, also has certain drawbacks. In particular, the method is sensitive to errors due to modeling of nonlinear systems as simple linear models.

That means on the one hand that the rougher the modeling, the more erroneous the control variables supplied. On the other hand, precise models are very bulky, so that a simplification of the modeling is widely sought in order to reduce processing times.

That also means that the method does not offer any generic quality for simulation from one flight point to another or from one aircraft to another. A new model then must be used and/or new parametrizations must be carried out in order to take into account this change of flight point or aircraft resulting from a leveling between two simulations.

Furthermore, the simulation time necessary for achieving the sought balance is not deterministic in this method. It therefore generally is necessary to limit the balancing time and to use the resulting, approximate, corresponding control variables.

Finally, this method is not repetitive because of numerical shifts introduced by the linear servoing. Different states of the aircraft thus are obtained for the same positioning thereof. Yet this property may prove to be significant when the effect of a parameter on the performance of the aircraft is analyzed by reproducing the simulation several times from the assumed same balance point.

SUMMARY OF THE INVENTION

This invention is intended to overcome at least one of the drawbacks of the above balancing methods and devices by proposing, first of all, a simulation platform comprising a plurality of equipment items of systems including at least one nonlinear system and comprising a device for balancing the said nonlinear system based on at least one recorded value to be attained as output of the nonlinear system, the said nonlinear system supplying at least one output value according to at least one control received as input, and the said balancing device comprising:
- a loop for servoing at least one output value to at least one corresponding recorded value, the servoing loop comprising a first filter producing an inversion of a simplified model of the said nonlinear system for generating a said control for the nonlinear system based on a model correction information item estimating a modeling error of the simplified model and an information item on difference between the output value and the corresponding recorded value, and
- a modeling corrector looping for supplying the said model correction information item to the said first filter, the said corrector looping comprising a second filter using the said simplified model of the nonlinear system for calculating the model correction information item on the basis of the command as output from the first filter and the said output value of the nonlinear system.

Within this platform, the invention may be seen as a simulation platform balancing device, comprising:
- at least one simulation component having a transfer function representative of a nonlinear system and forming part of the simulation platform;
- a first filter producing an inversion of a simplified model of the said transfer function, for generating a compensated control as input of the said simulation component based on at least one output value of the simulation component, at least one corresponding recorded value, and a model correction information item; and
- a second filter for calculating the model correction information item estimating a modeling error between the simplified model and the said simulation component, based on the simplified model, the compensated control and the said output value.

According to the invention, a simplified model of the transfer function of the nonlinear system to be balanced is used for calculating the balancing controls, which simplified model is corrected by modeling corrector looping. The latter refines the estimation of the modeling error until converging toward the precise modeling difference. The result is a correction from which a tolerance to the modeling error ensues. By virtue of this tolerance, rough models may be used for simpler and faster calculations.

Convergence toward the modeling difference is made possible by direct use of the simulation component (that is to say the nonlinear system) to be balanced, in the process of estimation of the correction information item by the second filter.

It thus is seen that, complementarily to the prior art where the balancing system usually comprises a linear feedback looping to make the output converge toward a target value, this invention provides a modeling corrector looping.

Furthermore, by virtue of this convergence, the first filter using the corrected simplified model tends to produce a perfect inversion of the dynamic of the simulation component. The result is a possible decoupling between the controls to be balanced.

According to one embodiment, the nonlinear system has an affine nonlinear transfer function having as input-output dynamic:

$$\tilde{Y} = F(X) + G(X) \cdot U$$

where U is a vector corresponding to the input control, X is a vector corresponding to a state of the nonlinear system and Y is a vector corresponding to at least one output value.

In this configuration, the modeling of the dynamic of the nonlinear system may be made simple. Moreover, its inversion for the first filter also is simple, consisting mainly in inverting the modeling of $G(X)$.

In particular, it is possible to reduce the modeling of $F(X)$ to a zero value. In fact it has been observed and demonstrated that the convergence of the second filter could be independent of $F(X)$. In this way, the first and second filters are simplified and their corresponding calculation times are reduced, In one embodiment, the second filter comprises components for estimating the integral of the difference between the output value of the simplified model corrected by the correction information item applied to the said generated control and the output value of the nonlinear system.

In this configuration, the dynamic of the second filter has the performance of a filter of the first order, therefore stable, having a reference equal to the error between the simplified model and the distinctive dynamic of the nonlinear system. The balancing system thus converges explicitly toward this modeling error.

The inventors in particular mathematically demonstrated and observed that, in the case of a mono-variable nonlinear system, this invention corrects a modeling error provided that it is strictly less than 100% in absolute value.

In particular, the said components for estimating comprise means for evaluating the output value of the simplified model based on the generated command, an adder/subtracter for modifying this value by subtraction of the correction information item, an integrator for integrating the output of the adder/subtracter and a second adder-subtracter for subtracting from the output of the integrator an integrated value of the output of the nonlinear system.

In particular, the second filter comprises a component multiplying the evaluated integral by a gain. By virtue of the stability of the second filter, the speed of convergence of the correction information item toward the modeling error is controlled by adapting this gain (one-to-one relationship between the speed of convergence and the value of the gain). In that way, a large-gain estimator of the model error is implemented in order to guarantee the determinism of the proposed balancing solution.

According to one embodiment, the said simplified model is affine nonlinear of the form $\tilde{Y}=F_m(X)+G_m(X)\cdot U$, and the modeling corrector looping (imparted by the second filter) is governed by:

$$\begin{cases} \Delta_{corr} = \omega_{corr} \int ((F_m(X) + G_m(X) \cdot U) - Y - \Delta_{corr}) dt \\ U = G_m^*(X) \cdot (v - F_m(X) + \Delta_{corr}), \end{cases}$$

where $\Delta_{corr}$ is the model correction information item, $\omega_{corr}$ is the gain of the second filter, and v is a value representative of the difference between the output value of the nonlinear system and the corresponding recorded value.

With this configuration, the implementation of the invention within the source code of the simulation application may be reduced to a sole line of code compared to the code for a standard linear servoing $U=K\cdot(Y_{cons}-Y)$. This additional line defines the modeling corrector looping according to the invention.

According to one characteristic of the invention, the device comprises a third linear filter for estimating an information item on difference of at least one output value of the nonlinear system and at least one corresponding recorded value, and supplying the said difference information item as input of the said first filter.

In this case, the ratio between the highest gain of the third filter and the said multiplier gain of the second filter:
- may be strictly less than ¼ to ensure an absolute non-interaction between the filters;
- may range between ½ and ⅔ without changing the qualities of stability and robust performances of the whole.

Correlatively, the invention also applies to a method for balancing a simulation platform comprising a plurality of equipment items of systems including at least one nonlinear system and comprising a device for balancing the said nonlinear system based on at least one recorded value to be attained as output of the nonlinear system, the said nonlinear system supplying at least one output value according to at least one control received as input, the method comprising, at the balancing device:
- a step of servoing the at least one output value to at least one corresponding recorded value, by inversion of a simplified model of the said nonlinear system, in order to generate a said control for the nonlinear system based on a model correction information item estimating a modeling error of the simplified model and an information item on difference between the output value and the corresponding recorded value, and;
- a step of modeling correction using the said simplified model of the nonlinear system for calculating the model correction information item based on the generated control and the said output value of the nonlinear system.

In other words, the method according to the invention also may be seen as a method for balancing a simulation platform comprising at least one simulation component having a transfer function representative of a system that may be nonlinear, the method comprising:
- a step of inverting a simplified model of the said transfer function, for generating a compensated control as input of the said simulation component based on at least one output value of the simulation component, at least one corresponding recorded value, and a model correction information item;
- a step of calculating the model correction information item estimating a modeling error between the simplified model and the said simulation component, based on simplified model, compensated control and said output value.

Optionally, the method may comprise steps relating to the characteristics of the balancing device described above.

In particular, the inverting and calculating steps are iterated so that the said model correction information item converges toward the modeling difference between the said simplified model and the transfer function of the component (of the nonlinear system). This iteration results from the corresponding modeling corrector looping in the balancing device.

The invention also applies to a computer program product that can be read by a microprocessor, comprising portions of software code adapted for implementing the balancing method according to the invention, when it is loaded and run by the microprocessor.

BRIEF DESCRIPTION OF THE DRAWINGS

Other features and advantages of the invention also will become apparent in the description below, illustrated by the attached drawings, in which.

DETAILED DESCRIPTION OF THE INVENTION

Figure 1:
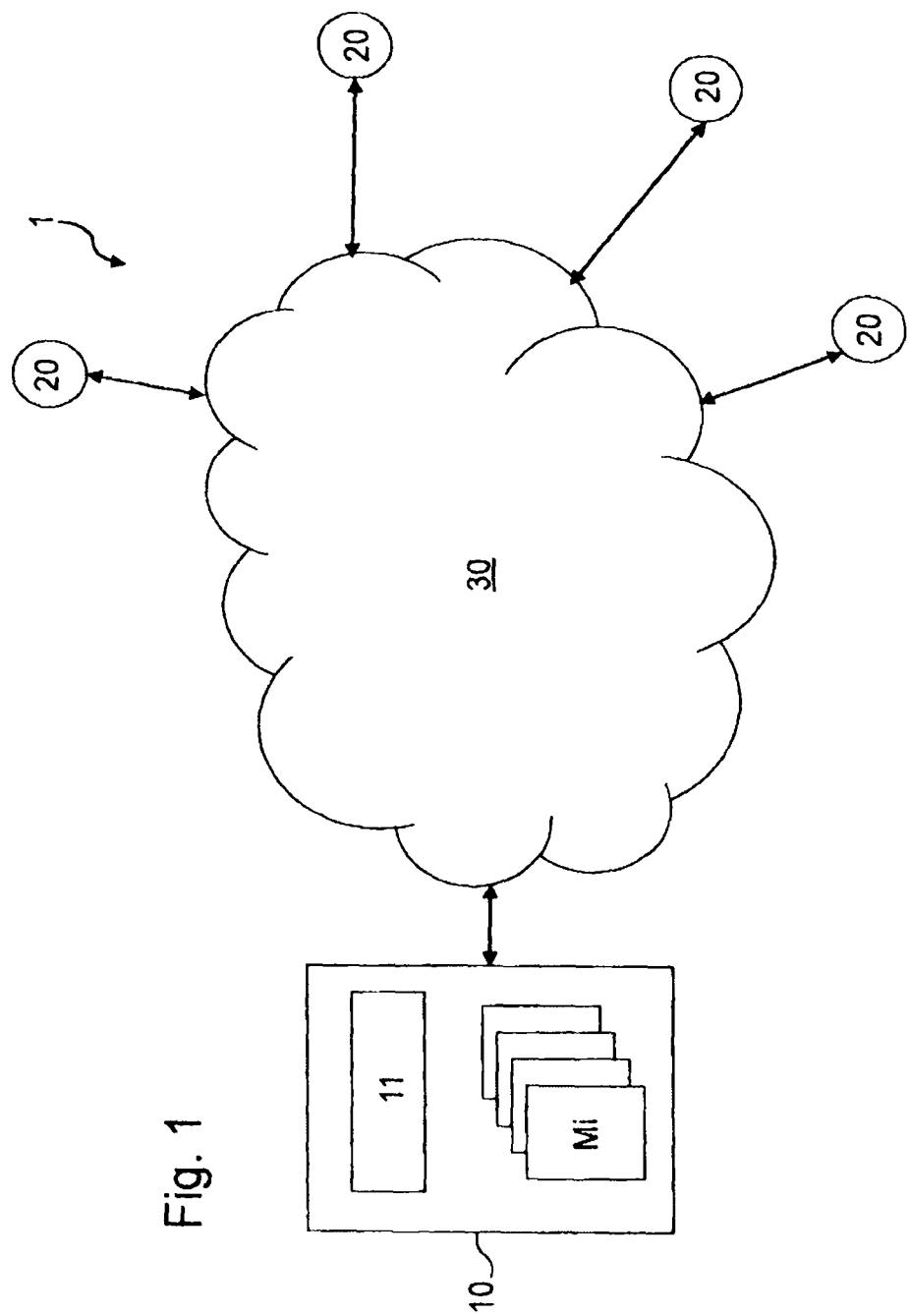
FIG. 1 shows a simulation platform for the implementation of this invention.

On FIG. 1, an on-board aircraft system simulator 1 comprises:
- a simulation unit 10, also called "host," for simulating a set of equipment items of the on-board system,
- a set of real on-board equipment items 20,
- and a network 30, for example of AFDX ("Avionics Full DupleX switched Ethernet") type, to enable data communication between the various equipment items of the aircraft whether these are real or simulated in host 10.

The equipment items of the aircraft are systems that have, in themselves, a distinctive dynamic. In particular, of interest in this example are systems for which a representation by state equations is affine nonlinear, adapted for the aeronautical field, as follows:

$$\begin{cases} \dot{X} = A(X) + B(X) \cdot U \\ Y = C(X) \end{cases} \qquad (1)$$

where $U \in R^m$ is the input of the system, otherwise known as variable control vector, $X \in R^n$ is the state (vector) of the system ($\dot{X}$ its derivative) and $Y \in R^p$ is the output of the system, otherwise known as variable observation vector.

In the example indicated above, the output may correspond to the longitudinal speed of the aircraft, the input may correspond to the throttle control (linked to the thrust) and the state variables of the system may represent the positions of the modifiable flight surfaces (flaps, airbrakes, etc.), the angle of attack of the aircraft, its mass, etc.

Figure 2:
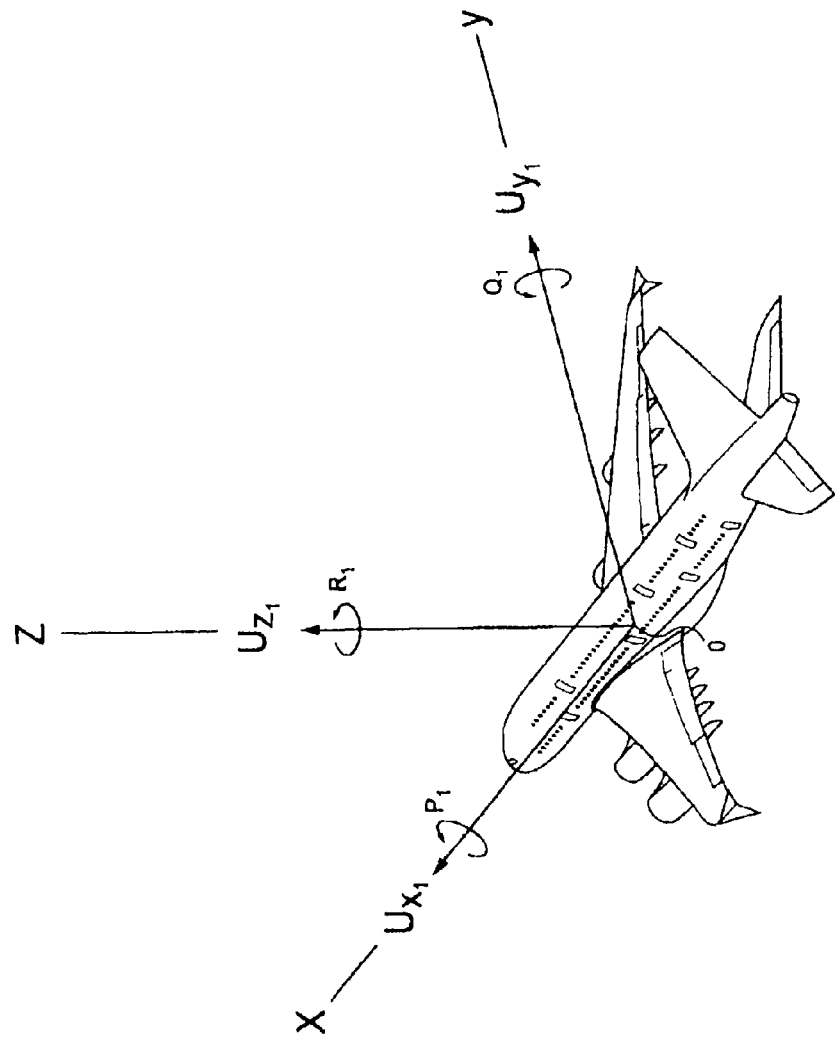
FIG. 2 illustrates the balancing of an aircraft in space.

Whether they are real (20) or simulated (Mi), these systems constitute components of the simulator (or "simulation components"). The balancing operation referred to in this example of the invention consists in particular in obtaining the control values U, such as the elevator, rudder, aileron and throttle controls, necessary for a position and a desired configuration of the simulated aircraft. These control values U correspond to certain observation values Y such as the following linear and angular accelerations $\dot{U}x_1, \dot{U}y_1, \dot{U}z_1, \dot{P}_1, \dot{Q}_1$ or $\dot{R}_1$ corresponding speeds $Ux_1, Uy_1, Uz_1, P_1, Q_1$ and $R_1$, as shown on FIG. 2. As for state X, it is defined by a set of other parameters of the aircraft, representative, for example, of magnitudes influencing the relationship between the values of U and Y.

Simulation unit 10 brings together a general simulation application 11 and a set of simulation models Mi each simulating the functions of a corresponding equipment item, for example a model for the automatic pilot, a model for the manual flight controls, etc. The simulation application supplies the software environment enabling the running of models Mi and the data transfer means between these models and the real external equipment items 20. These models Mi may, for example, be supplied by the manufacturers of the corresponding equipment items.

Depending on the simulations, certain models M, may be replaced, in simulator 1, by the corresponding real equipment items, and vice versa. That makes it possible to progressively test the integration of these real equipment items in the onboard network.

Simulator 1 in particular may take the form of a prototype in which operators are seated in order to conduct tests, for example a test cabin raised on jacks.

Figure 3:
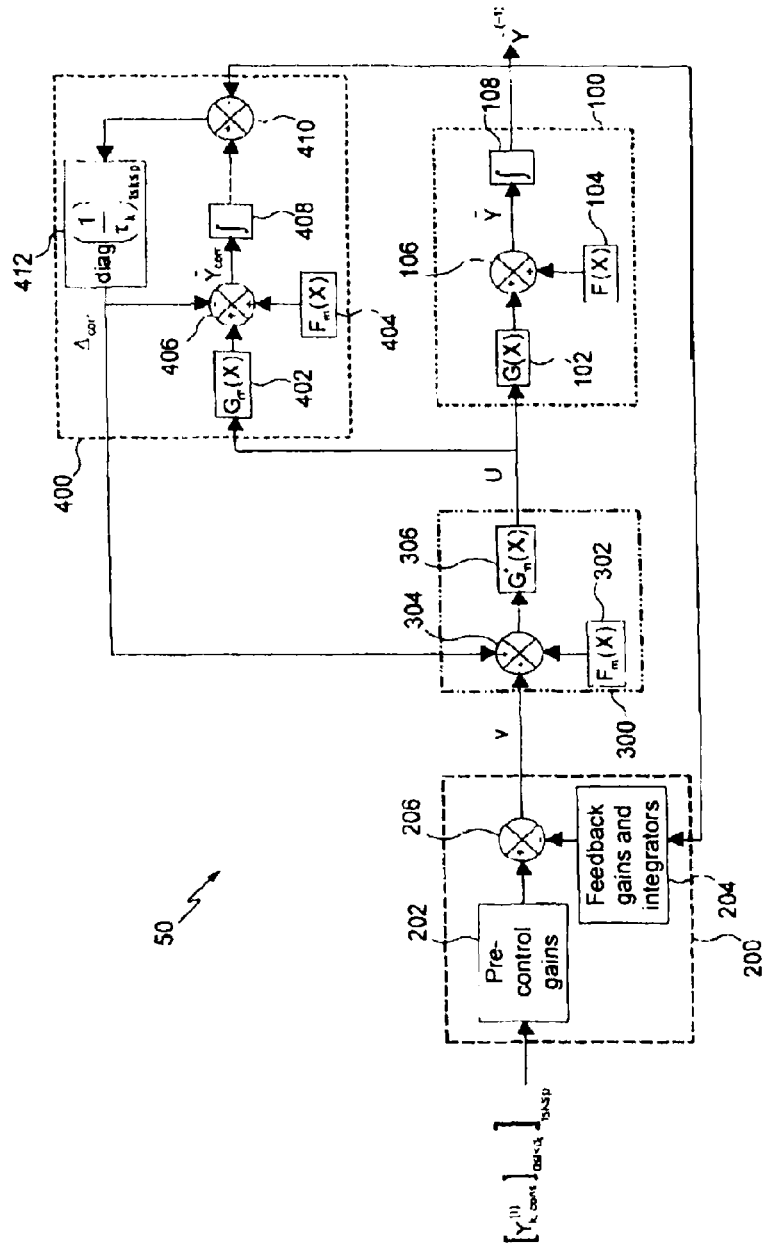
FIG. 3 shows an exemplary balancing device according to the invention.

FIG. 3 shows an exemplary logic servoing device 50, an object of this invention, for balancing one or more simulation components 100, or even the entirety of simulator 1.

Given the "relative degree," defined as the minimal necessary order of derivation of $Y_i$, exhibiting a dependence on U or one of its components. Block 100 represents one or more controllable affine nonlinear simulation components an input-output representation of which, referred to as transfer function, is:

$$\tilde{Y} = \begin{bmatrix} Y_1^{(d_1)}(U) \\ \vdots \\ Y_p^{(d_p)}(U) \end{bmatrix} = F(X) + G(X) \cdot U \quad (2)$$

where $d_i$ is the relative degree of each output $Y_i$ ($Y_i^{(d_i)}$ being the $d_i$-th derivative of $Y_i$), and F and G nonlinear functions. In the aeronautical field, these functions F and G have in particular partial derivatives up to the order 2 which are bounded guaranteeing control of the aircraft.

These simulation components 100 are black boxes for the operator, either because of the complexity of the corresponding model Mi (the nonlinear F and G functions), or because it is a matter of closed real equipment items for which neither F nor G is known.

The difficulties of the prior art thus were:
  obtaining a near-perfect modeling of each component so as to limit the balancing errors to the risk of a totally unacceptable design load factor, and
  using a simple model as basis, thus compromising precision, determinism and repetitiveness of the balancing device.

This invention makes it possible to be freed in part from this modeling precision constraint by virtue of a tolerance on the compensated modeling through an estimation of the modeling error with the aid of the modeled component.

Block 100 has been shown from a functional point of view with a block 102 calculating G(X) and multiplying it at the input of control U, a block 104 for calculating F(X), an adder 106 adding the outputs of blocks 102 and 104 to obtain output $\tilde{Y}$.

It is possible, however, for the real equipment items (and thus also the corresponding models Mi) to supply each output $Y_i$ at a derivation index equal to $d_i-1$. This configuration is illustrated here by integrator 108 which thus supplies an integrated output, marked $\tilde{Y}^{(-1)}$, based on $\tilde{Y}$.

For purposes of balancing components 100 of the simulation platform, there is available a simplified modeling of the distinctive dynamic of real equipment item 20 or of the component modeled by Mi through functions $F_m(X)$ and $G_m(X)$ (generally in the form of matrices, also having bounded partial derivatives up to the order 2). In that way the simplified modeling introduces a modeling error, marked $\Delta_m$.

Thus the modeled transfer function is as follows:

$$\tilde{Y} = F_m(X) + G_m(X) \cdot U$$

Balancing device 50 of components 100 receives as input recorded values $Y_{cons}$ defining the position and desired configuration of the aircraft. These recorded values are made up of all the derivatives $Y_{k,cons}^{(i)}$, $0 \leq i < d_k$. Generally, these recorded values are limited to the position (or angle), speed and acceleration.

Block 200 is a linear control filter which receives, besides the recorded values, the integrated output $\tilde{Y}^{(-1)}$ of block 100, and supplies as output a value v representative of a difference between output $\tilde{Y}$ of block 100 and the recorded values, which may be represented schematically by $v=\omega(\tilde{Y}_{cons}-\tilde{Y})$ where $\omega$ is the gain of filter 200 ($\omega_i$ for each component of $\tilde{Y}$).

In detail, block 200 comprises a block 202 for amplification of the recorded values producing a matrix product with a precontrol gain matrix (gain in second$^{-1}$), a block 204 for amplification (gain in s$^{-1}$) and integration of the integrated output values $\tilde{Y}^{(-1)}$ also producing a matrix product.

The outputs of blocks 202 and 204 are subtracted one from the other by adder 206 to supply output vector v of block 200.

Block 200 thus implements a servoing of the output of components 200 to the recorded values.

The modeled dynamic inversion filter 300 receives the vector v of the outputs compared with the recorded values, inverts them so as to estimate a vector of control U. This vector of control U is used as input of component 100 to be balanced.

Because of the servoing imparted by block 200, the vector of control U evolves until achieving balance of system 50, that is to say when block 300 controls component 100 in order to obtain the recorded values as output of block 100.

According to the invention, filter 300 further receives, as input, a correction information item for the model $\Delta_{corr}$. This correction information item is an estimator (or observer) with large gain generated by filter 400 as described below, converging toward the modeling error $\Delta_m$ by virtue of its composition.

In detail, filter 300 comprises a block 302 for estimating the value $F_m(X)$ and an adder 304 adding the two outputs v and $\Delta_{corr}$, and subtracting the output of block 302.

Block 306 receives the output of adder 304, calculates the value $G_m^*(X)$ where $G_m^*$ is the inverse (or pseudo-inverse on the right) of Gm, then multiplies these two values.

The output of filter 300 is the vector of control U compensated or corrected by the error $\Delta_{corr}$ thus verifying:

$$U = G_m^*(X) \cdot (v + \Delta_{corr} - F_m(X))$$

As a result of the convergence of $\Delta_{corr}$ toward $\Delta_m$, the dynamic inversion of filter 300 is asymptotically perfect. It thus provides decoupling and asymptotic linearization of the output-input relationships, which enables a simplified control-by-control balancing.

Filter 400 is a large-gain estimator of the modeling error $\Delta_m$ by asymptotic convergence.

Filter 400 receives as input the vector of control U originating from filter 300 and the integrated outputs $\tilde{Y}^{(-1)}$ of block 100. As a variant, it may receive the $\tilde{Y}$ outputs of block 100 in which case it implements, itself, integration 108.

A chosen estimator is $$\Delta_{corr} = \begin{pmatrix} 1/\tau_1 & 0 & 0 \\ 0 & \cdots & 0 \\ 0 & 0 & 1/\tau_p \end{pmatrix} \cdot \int (\tilde{Y}_{corr} - \tilde{Y}) \cdot dt$$

where $\tilde{Y}_{corr}$ is the vector of outputs of the simplified model corrected with the aid of correction information items $\Delta_{corr}$ when it takes as input the controls U resulting from filter 300:

$$\tilde{Y}_{corr} = F_m(X) + G_m(X) \cdot U - \Delta_{corr}.$$

A simple rewriting of this estimator $$\Delta_{corr} = \text{diag}\left(\frac{1}{\tau_i}\right) \cdot \int (\Delta_m - \Delta_{corr}) \cdot dt$$

shows that filter 400 performs as a filter of first order having as reference $\Delta_m$. In this estimator, the gain associated with each output $Y_i$ is based on the gauging of a sole parameter: the time constant $\tau_i$. It thus is easy to modify balancing system 50 so as to ensure an also rapid convergence toward all the recorded values. It will be noted that the use of large gains $$\frac{1}{\tau_i}$$

ensures significant convergence speeds of filter 400 toward the controls to be balanced. As a result, the system is deterministic. Care will be taken, however, to maintain a ratio between the gains $\omega_i$ of filter 200 and the gains $$\frac{1}{\tau_i}$$

of filter 400 less than ½ in order to guarantee stability and robustness of the balancing system: $0 < \omega_i \tau_i < \frac{1}{2}$. Possibly, $0 < \omega_i \tau_i \leq \frac{1}{4}$ may be chosen so as to ensure an absolute non-interaction (non-overlap) between the filters of the system. In particular, $\omega_i \tau_i = \frac{1}{4}$ may be chosen, this ratio providing the advantages indicated above while generally maintaining a large gain $$\frac{1}{\tau_i}$$

of filter 400, and reasonable from the viewpoint of the Shannon limit beyond which the effects of discretization become significant.

In detail, filter 400 comprises a block 402 receiving the input of control U. This block 402 estimates $G_m(X)$ then multiplies it at input U.

A second block 404 estimates $F_m(X)$.

An adder 406 adds the outputs of blocks 402 and 404, and subtracts the estimator $\Delta_{corr}$ supplied as output of filter 400, thus supplying the corrected output vector $\tilde{Y}_{corr}$.

The output of adder 406 then is integrated by integrator 408.

A second adder 410 receives the integrated value of $\tilde{Y}_{corr}$ and subtracts therefrom the integrated output vector $\tilde{Y}^{(-1)}$ of block 100.

The output of adder 410 is amplified by large-gain block 412 in order to obtain estimator $\Delta_{corr}$ used as the model correction information item by filter 300.

By using small time constants $\tau_i$, the estimator provided in this example of the invention is large gain, offering stability and robustness while converging toward the modeling error $\Delta_m$.

Filter 400 constitutes the heart of the modeling corrector looping between the nonlinear simulation component to be balanced and standard servoing filter 300.

Balancing of the simulation platform thus is achieved when significant modeling errors are made. For example, in the case of a dynamic of component 100 based on a mono-variable relationship, a modeling error up to 100% (strictly lesser) in absolute value is acceptable.

Balancing device 50, like any computer method, is used in discretionary manner. It results in the following writing of the control law between two consecutive iterations n and n+1:

$$\begin{cases} \Delta_{corr_{n+1}} = \Delta_{corr_n} + \delta t \left( \omega_{corr} \left[ (F_m + G_m U_n) - \tilde{Y}_n - \Delta_{corr_n} \right] \right) \\ U_n = G_m^* \left( \omega (\tilde{Y}_{cons} - \tilde{Y}_n) - F_m + \Delta_{corr_{n+1}} \right) \end{cases}$$

where $\omega_{corr}$ is the gain of filter 400 and $\omega$ is the gain of filter 200.

This representation may be coded in only two lines by servoing in the computer balancing program.

In comparison, the standard servoing of the prior art $U_n = K(Y_c - Y_n)$, is coded in one line.

The cost of software implementation of this invention may turn out to be low (one line of additional code for coding the modeling corrector looping) from the viewpoint of gains obtained. Furthermore, it seems simple to update the current balancing programs by modification/addition of these lines of code.

By way of illustration, we consider the balancing of the throttle lever (thrust of the airplane) in order to obtain a desired horizontal speed $U_{x1}$. By virtue in particular of the decoupling resulting from the perfect asymptotic inversion of filter 300, it is possible to balance the airplane axis by axis.

In this illustrative example, component 100 of the airplane considered has the following relationship: $m\dot{U}x_1 = \frac{1}{2}\rho V^2 S C_x(\alpha) + T \cdot \cos(\alpha) + P \sin(\alpha)$, where V is the norm of the velocity vector of the airplane (m/s);

α: angle of attack (degrees);
m: mass (kg);
ρ: density of the air (kg/m³);
S: reference surface of the wings (m²);
$C_X(\alpha)$: illustrates the dependence of the drag on a; and
P: norm of the resultant of lift+weight (N), insignificant a priori in the presence of m, P=0.

All of these information items intervene in the state X of the aircraft at the moment sought to be balanced.

The member —½ρV²SC$_x$(α) corresponds to the drag of the aircraft; the member T·cos(α), to the thrust of the aircraft; and the member P sin(α), to the lift and to the weight of the aircraft.

Knowing that Ux$_1$=V cos(α), with the set of rewritings there is obtained:

$$\dot{U}x_1 = -\frac{\rho SC_x(\alpha)}{2m(\cos(\alpha))^2}(Ux_1)^2 + \frac{\cos(\alpha)}{m}(T)$$

By adopting the representation of state: Y=X=U$_{x1}$, U=T, there is inferred F(X) and G(X)=G from the system, clearly nonlinear:

$$F(Ux_1) = -\frac{\rho SC_x(\alpha)}{2m(\cos(\alpha))^2}(Ux_1)^2 \text{ and } G(Ux_1) = G = \frac{\cos(\alpha)}{m}.$$

For our example, we take the following fixed parameters for balance:
m: 100000 kg
ρ: 1 kg/m³
S: 200 m²
C$_x$(α): 0.5 for alpha=5 degrees
α: 5 degrees.
That being the case, $$F(X) = -\frac{1}{1984.032}(X)^2 \text{ and } G(X) = G = \frac{1}{100401.6}$$

The discretionary writing for our example is:

$$\begin{cases} \Delta_{corr_{n+1}} = \Delta_{corr_n} + \delta t(\omega_{corr}[(F_m + G_m T_n) - Ux_{1n} - \Delta_{corr_n}]) \\ T_n = G_m^*(\omega(Ux_{1cons} - Ux_{1n}) - F_m + \Delta_{corr_{n+1}}) \end{cases}$$

To carry out balancing of the airplane with the determination of U=T, the following model is used: F$_m$=0, G$_m$=50%*1/m. ω$_{corr}$=4ω=4 rad/s also is chosen.

The approximation F$_m$(X)=0 makes it possible to reduce the balancing circuit and calculation costs because blocks 302 and 404 then may be omitted. This approximation results from the fact that the convergence of estimator 400 toward modeling error Δ$_m$ is independent of the modeling error of F.

Figure 4A:
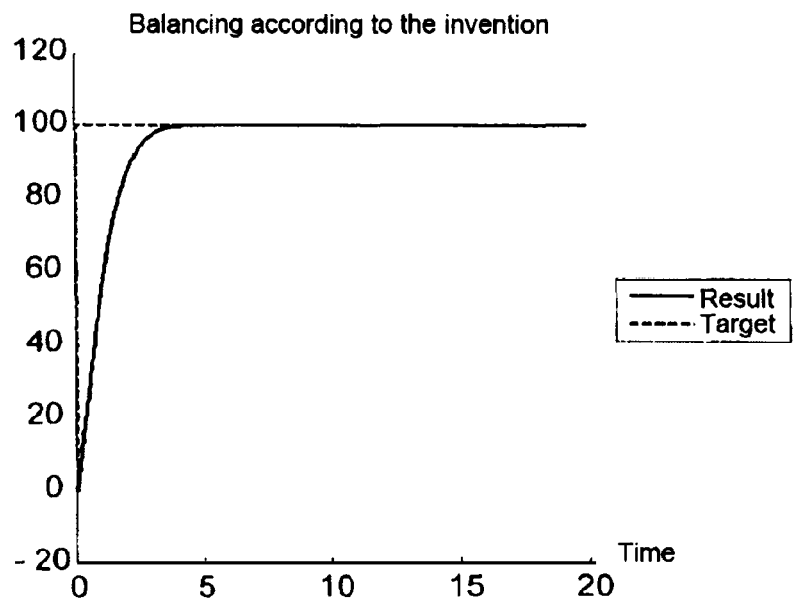
FIGS. 4a and 4b show graphs illustrating comparatively the performances of the invention in relation to the known solutions.

FIG. 4a shows the result of balancing obtained in this case by implementation of this invention.

Figure 4B:
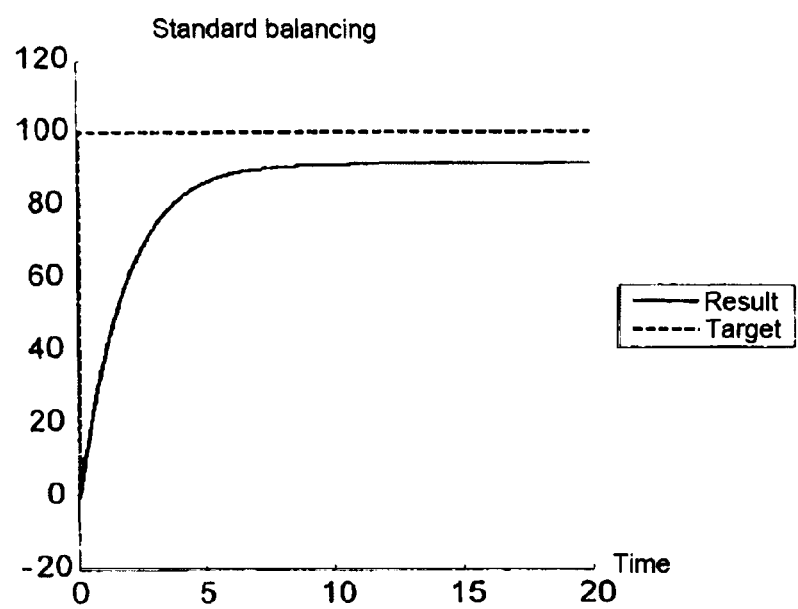

FIG. 4b shows the result of balancing obtained in this case also by implementation of a linear servoing of the state of the art U=K (Y$_c$-Y). In order to compare the same dynamics, the graph 4b was obtained by using a gain K=ω·G$_m$*. It is seen that the desired output value ('target') which corresponds in particular to the output value of the model used on applying the balance control obtained clearly differs from the output value of component 100 with this same balance control obtained ('result' output value). This difference results from the modeling error which, in the standard case, remains uncorrected.

Through comparison of these two graphs, it is seen that the determination of controls U of the system to be balanced is faster and more precise by using the invention. In particular, the modeling error is eliminated by implementation of the invention (the target and the result are merged), whereas it endures with the techniques of the prior art.

By virtue of an effective and precise balancing resulting from implementation of the invention, the transition between the initial phase of balancing/configuration of the simulation prototype and the operation/test phase is not subject to any discontinuity of values leading, for example, to jolting thereof or even a falling of the test cabin (for example following a virtual releasing of the simulated airplane).

Furthermore, the high tolerance to modeling errors makes it possible to use similar models for the same aircraft the simulation components of which evolve and are updated throughout the development of the aircraft, or even for aircraft of different types. The solution proposed by this invention thus is generic.

Furthermore, the decoupling ensured by the inversion of filter 300 makes it possible to easily regulate the profile and the time of convergence of the large-gain estimator (filter 400), by gauging a gain 1/τ$_i$ for a given control. In this way the balancing device may be made deterministic.

It also is noted that the numerical drift, seen from the large-gain estimator, is only an error like any other. As shown above, estimator 400 therefore corrects this error until its effect is cancelled. The result is a repetitiveness of the proposed balancing system.

It will be observed, as described in the thesis "*Methodology of synthesis of nonlinear and robust control laws: Application to the tracking of transport airplanes*," Fabien Layergne, 2005, that a circuit partially similar to the one in FIG. 3 could be provided at the equipment items of an aircraft, that is to say in the system modeled by block 100 of FIG. 3, for purposes of correcting actuator nonlinearities during operation of the aircraft, that is to say its actual roll or its actual flight. In comparison, the balancing circuit according to the invention applies to simulation components representative of such aircraft equipment items in order, not to compensate for possible actuator nonlinearities, but to use simplified models (whether or not the transfer function of the simulation component is known) for calculating balance points.

The preceding examples are merely embodiments of the invention, which is not limited thereto.

In particular, the large-gain estimator explained above covers the functions of F$_m$ and G$_m$ modeling together in the same integral. Two parallel filters 400 could be provided, however, each implementing a large-gain estimator of the modeling error of each of the two functions. In this way, the convergence profiles of the two filters 400 could be adapted individually to the respective modeling errors, according to the robustness of the proposed estimator.

Also, although the invention has been described in the aeronautical field, it may be applied to the balancing of simulation platforms in varied fields, in particular automotive, space, railroad or water sports.

The invention claimed is:
1. A simulation platform, comprising:
a plurality of equipment items of systems including a nonlinear system; and
a hardware processor configured to implement a balancing device for the nonlinear system to perform balancing of the nonlinear system based on a corresponding recorded value to be attained as output of the nonlinear system,
wherein the nonlinear system supplies an output value according to a control received as input, and
the balancing device implemented by the hardware processor performs:

servoing, via a loop, the output value to the corresponding recorded value, the servoing loop including a first filter that produces an inversion of a simplified model of the nonlinear system for generating said control for the nonlinear system based on a model correction information item estimating a modeling error of the simplified model and an information item, the information item being a difference between a value based on the output value and the corresponding recorded value, and supplying, via a modeling corrector looping, the model correction information item to the first filter, the corrector looping including a second filter that uses the simplified model of the nonlinear system for calculating the model correction information item based on the control as output of the first filter and the value based on the output value of the nonlinear system, wherein the nonlinear system has an affine nonlinear transfer function having as input-output dynamic:

$$\tilde{Y}=F(X)+G(X)\cdot U$$

where U is a vector corresponding to the input control, X is a vector corresponding to a state of the nonlinear system and Y is a vector corresponding to the output value, and wherein the simplified modeling of F(X) has a zero value.

2. The platform according to claim 1, wherein the simplified model is affine nonlinear of the form $Y=F_m(X)+G_m(X)\cdot U$, and the modeling corrector looping is governed by:

$$\begin{cases} \Delta_{corr} = \omega_{corr} \int ((F_m(X) + G_m(X)\cdot U) - Y - \Delta_{corr})dt \\ U = G_m^*(X)\cdot(v - F_m(X) + \Delta_{corr}), \end{cases}$$

where $A_{corr}$ is the model correction information item, $\omega_{corr}$ is the gain of the second filter, v is a value representative of the difference between the value based on the output value of the nonlinear system and the corresponding recorded value, and $G_m^*$ is the inverse of $G_m$.

3. The platform according to claim 1, wherein the second filter includes components that estimate an integral of a difference based on an output value of the simplified model corrected by the correction information item applied to the generated control and the value based on the output value of the nonlinear system.

4. The platform according to claim 3, wherein the components that estimate:
evaluate the output value of the simplified model based on the generated control,
modify, using a first adder/subtractor, the output value of the simplified model by subtraction of the correction information item,
integrate, using an integrator, the output of the first adder/subtractor, and
subtract, using a second adder/subtractor, from the output of the integrator the value based on the output value of the nonlinear system, which is an integrated value of the output of the nonlinear system.

5. The platform according to claim 4, wherein the second filter includes a component that multiplies the output of the second adder/subtractor by a gain.

6. The platform according to claim 1, further comprising a third linear filter that estimates the information item as the difference of the value based on the output value of the nonlinear system and the corresponding recorded value, and that supplies the information item as input of the first filter.

7. A method for balancing a simulation platform, the platform including a plurality of equipment items of systems including a nonlinear system and a balancing device, implemented by a hardware processor, for the nonlinear system to perform balancing of the nonlinear system based on a corresponding recorded value to be attained as output of the nonlinear system, the nonlinear system supplying an output value according to a control received as input, the method comprising, using the balancing device implemented by the hardware processor:

servoing, using the hardware processor, the output value to the corresponding recorded value, by inversion of a simplified model of the non-linear system for generating control for the nonlinear system based on a model correction information item estimating a modeling error of the simplified model and an information item, the information item being a difference between a value based on the output value and the corresponding recorded value; and using the hardware processor, performing modeling correction using the simplified model of the nonlinear system for calculating the model correction information item based on the generated control and the value based on the output value of the nonlinear system, wherein the nonlinear system has an affine nonlinear transfer function having as input-output dynamic:

$$\tilde{Y}=F(X)+G(X)\cdot U$$

where U is a vector corresponding to the input control, X is a vector corresponding to a state of the nonlinear system and Y is a vector corresponding to the output value, and wherein the simplified modeling of F(X) has a zero value.

8. A non-transitory computer-readable medium storing instructions which, when executed by the hardware processor, performs causes the hardware processor to perform the balancing method according to claim 7.

9. A device for balancing a simulation platform, comprising:
a simulation component having a transfer function representative of a nonlinear system and forming part of the simulation platform; and
a hardware processor including:
a first filter that produces an inversion of a simplified model of the transfer function to generate a compensated control as input of the simulation component based on an output value of the simulation component, a corresponding recorded value, and a model correction information item, and
a second filter that calculates the model correction information item estimating a modeling error between the simplified model and the simulation component based on the simplified model, the compensated control and the output value of the simulation component,
wherein the transfer function of the simulation component is affine nonlinear having as input-output dynamic:

$$\tilde{Y}=F(X)+G(X)\cdot U$$

where U is a vector corresponding to the input control, X is a vector corresponding to the state of the simulation component and Y is a vector corresponding to the output value, and wherein the modeling of F(X) has a zero value.

10. The device according to claim 9, wherein the simplified model is affine nonlinear of the form $Y=F_m(X)+G_m(X)\cdot U$, and the servoing imparted by the second filter is governed by:

$$\begin{cases} \Delta_{corr} = \omega_{corr} \int ((F_m(X) + G_m(X) \cdot U) - Y - \Delta_{corr})dt \\ U = G_m^*(X) \cdot (v - F_m(X) + \Delta_{corr}), \end{cases}$$

where $\Delta_{corr}$ is the model correction information item, $\omega_{corr}$ is the gain of the second filter, v is a value representative of a difference between either the output value or a value based on the output value of the simulation component and the corresponding recorded value and $G_m^*$ is the inverse of $G_m$.

11. The device according to claim 9, wherein the second filter includes components that estimate an integral of a difference based on an output value of the simplified model corrected by the model correction information item applied to the compensated control and either the output value or a value based on the output value of the simulation component.

12. The device according to claim 11, wherein the components that estimate:
evaluate the output value of the simplified model based on the compensated control,
modify, using a first adder/subtractor, the output value of the simplified model by subtraction of the model correction information item,
integrate, using an integrator, the output of the first adder/subtractor, and
subtract, using a second adder/subtractor, from the output of the integrator the value based on the output value of the simulation component, which is an integrated value of the output of the simulation component.

13. The device according to claim 12, wherein the second filter includes a component that multiplies the output of the second adder/subtractor by a gain.

14. The device according to claim 9, wherein the hardware processor further includes a third linear filter that estimates an information item as a difference of either the output value or a value based on the output value of the simulation component and the corresponding recorded value, and that supplies the difference information item as input of the first filter.

15. A method for balancing using a simulation platform including a simulation component having a transfer function representative of a nonlinear system, the method comprising:
performing the following processes using hardware processing simulation circuitry:
inverting, through a first filter, a simplified model of the transfer function to generate a compensated control as input of the simulation component based on an output value of the simulation component, a corresponding recorded value, and a model correction information item; and
calculating, through a second filter, the model correction information item estimating a modeling error between the simplified model and the simulation component based on the simplified model, compensated control and the output value of the simulation component,
wherein the transfer function of the simulation component is affine nonlinear having as input-output dynamic:

$$\tilde{Y} = F(X) + G(X) \cdot U$$

where U is a vector corresponding to the input control, X is a vector corresponding to the state of the simulation component and Y is a vector corresponding to the output value, and
wherein the modeling of F(X) has a zero value.

* * * * *